US011795822B2

(12) United States Patent
Theurich et al.

(10) Patent No.: US 11,795,822 B2
(45) Date of Patent: Oct. 24, 2023

(54) ROTOR ARRANGEMENT FOR A GAS TURBINE WITH INCLINED AXIAL CONTACT SURFACES FORMED ON ROTOR SEGMENTS, GAS TURBINE AND AIRCRAFT GAS TURBINE

(71) Applicant: MTU Aero Engines AG, Munich (DE)

(72) Inventors: Daniel Theurich, Munich (DE); Knut Werner, Munich (DE); Hans-Peter Hackenberg, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 17/963,211

(22) Filed: Oct. 11, 2022

(65) Prior Publication Data

US 2023/0111341 A1 Apr. 13, 2023

(30) Foreign Application Priority Data

Oct. 12, 2021 (DE) ......................... 102021126427.8

(51) Int. Cl.
*F03D 5/06* (2006.01)
*F01D 5/06* (2006.01)

(52) U.S. Cl.
CPC .......... *F01D 5/066* (2013.01); *F05D 2230/64* (2013.01); *F05D 2260/30* (2013.01)

(58) Field of Classification Search
CPC ... F01D 5/02; F01D 5/06; F01D 5/066; F01D 5/30; F01D 5/3015; F05D 2230/64; F05D 2260/30
See application file for complete search history.

(56) References Cited

U.S. PATENT DOCUMENTS 4,453,889 A * 6/1984 Sakata .................... F01D 5/066
416/198 A
8,459,943 B2 6/2013 Schutte et al.
8,794,923 B2 8/2014 Tirone, III et al.
10,125,785 B2 * 11/2018 Wilber .................. F04D 29/083
(Continued)

FOREIGN PATENT DOCUMENTS

DE 4215050 A1 11/1993
EP 0028217 A1 5/1981
(Continued)

*Primary Examiner* — David E Sosnowski
*Assistant Examiner* — Maxime M Adjagbe
(74) *Attorney, Agent, or Firm* — LEYDIG, VOIT & MAYER, LTD.

(57) ABSTRACT

A rotor assembly may be used in a gas turbine. The rotor assembly includes rotor segments arranged in succession in an axial direction and interconnected in the axial direction by a tie-rod, and a rotor segment disposed forwardly in the axial direction having a first contact surface and a rotor segment disposed rearwardly in the axial direction having a second contact surface. The first and second contact surfaces are at least partially in contact with each other, are substantially annular in shape, and extend in a radial direction and in a circumferential direction. The first contact surface and/or the second contact surface extend at least partially obliquely relative to the radial direction. An angle is formed between the first contact surface and the second contact surface when viewed in a sectional plane defined by the axial direction and the radial direction.

11 Claims, 2 Drawing Sheets

(56) References Cited

U.S. PATENT DOCUMENTS

| | | | | |
|---|---|---|---|---|
| 10,400,679 | B2 * | 9/2019 | Wilshaw | F02C 3/04 |
| 10,508,547 | B2 * | 12/2019 | Rawe | F04D 29/321 |
| 2007/0009360 | A1 | 1/2007 | Alam et al. | |
| 2010/0290904 | A1 | 11/2010 | Wilson | |
| 2011/0219781 | A1 | 9/2011 | Benjamin et al. | |
| 2014/0099210 | A1 * | 4/2014 | Miller | F01D 5/066<br>416/198 A |
| 2018/0058219 | A1 * | 3/2018 | Kampka | F01D 5/32 |
| 2020/0291781 | A1 | 9/2020 | Dibenedetto | |

FOREIGN PATENT DOCUMENTS

| | | | |
|---|---|---|---|
| EP | 2330305 | A1 | 6/2011 |
| EP | 2677120 | A1 | 12/2013 |
| EP | 3290635 | A1 | 3/2018 |
| WO | WO 2014039826 | A1 | 3/2014 |

* cited by examiner

ROTOR ARRANGEMENT FOR A GAS TURBINE WITH INCLINED AXIAL CONTACT SURFACES FORMED ON ROTOR SEGMENTS, GAS TURBINE AND AIRCRAFT GAS TURBINE

CROSS REFERENCE TO RELATED APPLICATIONS

This application claims benefit to German Patent Application No. DE 102021126427.8, filed on Oct. 12, 2021, which is hereby incorporated by reference herein.

FIELD

The present disclosure relates to a rotor arrangement for a gas turbine with inclined axial contact surfaces formed on rotor segments, a gas turbine, and an aircraft gas turbine.

BACKGROUND

In rotor assemblies, the high thermal and mechanical effects occurring in the region of the axially abutting contact surfaces, especially during operation of the gas turbine, cause large axial stresses in each two adjacent rotor segments that form part of a group of components connected and axially clamped together by a tie-rod, which group of components includes a plurality of rotor segments. It has been found that high loads in the group of components connected by the tie-rod result in, in particular annularly shaped and radially very limited, in particular thin force-transmission zones in which pronounced axial force peaks are transmitted, which results in the undesirable high stresses mentioned. In such highly loaded force-transmission regions, there is an increased risk of wear, in particular a potential for fretting.

With regard to the general technical background, reference is made, by way of example, to the following documents: U.S. Pat. Nos. 8,459,943 B2, 8,794,923 B2, US 2011/0219781 A1 and US 2020/0291781 A1.

Directional words such as “axial,” “axially,” “radial,” “radially,” and “circumferential” are taken with respect to the machine axis of the gas turbine, unless explicitly or implicitly indicated otherwise by the context.

SUMMARY

In an embodiment, the present disclosure provides a rotor assembly that may be used in a gas turbine. The rotor assembly has a plurality of rotor segments arranged in succession in an axial direction and interconnected in the axial direction by at least one tie-rod; and a rotor segment disposed forwardly in the axial direction having a first contact surface and a rotor segment disposed rearwardly in the axial direction having a second contact surface. The first contact surface and the second contact surface are at least partially in contact with each other. The first contact surface and the second contact surface are substantially annular in shape and extend in a radial direction and in a circumferential direction. The first contact surface and/or the second contact surface extend at least partially obliquely relative to the radial direction. An angle is formed between the first contact surface and the second contact surface when viewed in a sectional plane defined by the axial direction and the radial direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
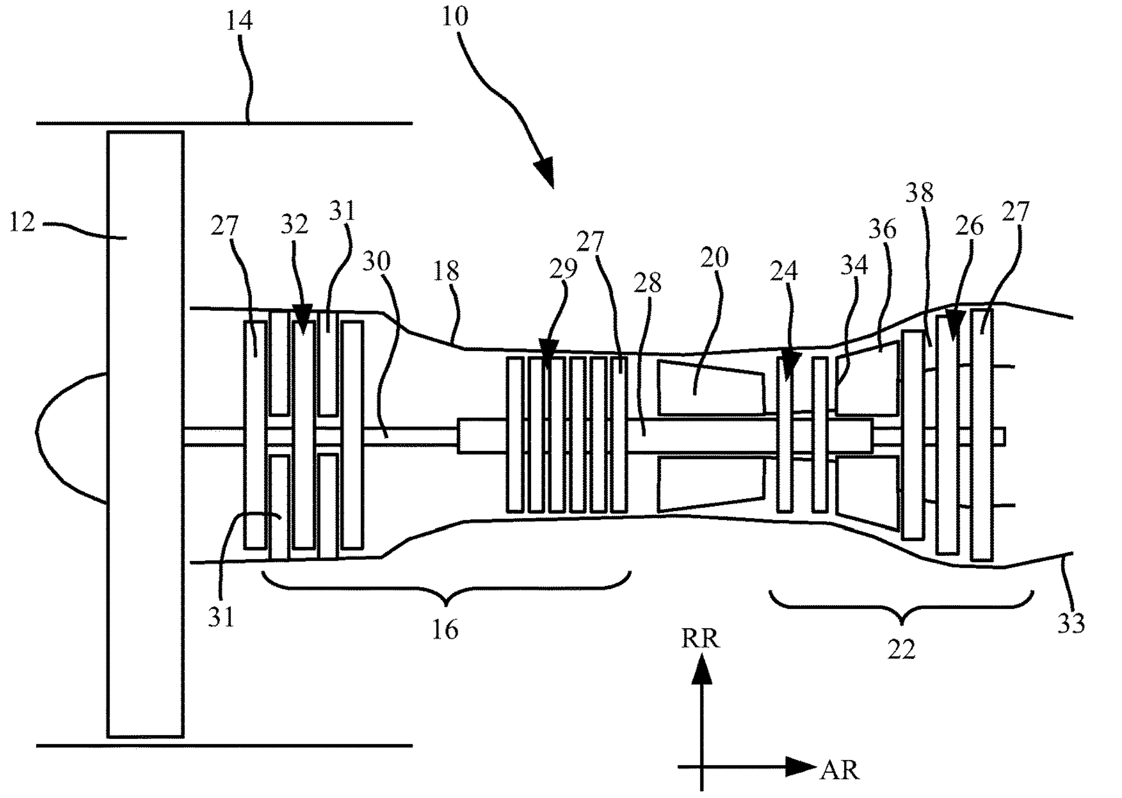
FIG. 1 is a schematic representation of an aircraft gas turbine.

The present disclosure relates to a rotor assembly for a gas turbine, in particular an aircraft gas turbine, the rotor assembly having a plurality of rotor segments arranged in succession in the axial direction and interconnected in the axial direction by at least one tie-rod device, a rotor segment disposed forwardly in the axial direction having a first contact surface and a rotor segment disposed rearwardly in the axial direction having a second contact surface, the first contact surface and the second contact surface being at least partially in contact with each other, and the first contact surface and the second contact surface being substantially annular in shape and extending in the radial direction and in the circumferential direction.

Aspects of the present disclosure provide a rotor assembly that will overcome the above discussed disadvantages.

Accordingly, there is provided a rotor assembly for a gas turbine, in particular an aircraft gas turbine, the rotor assembly having a plurality of rotor segments arranged in succession in the axial direction and interconnected in the axial direction by at least one tie-rod device; a rotor segment disposed forwardly in the axial direction having a first contact surface and a rotor segment disposed rearwardly in the axial direction having a second contact surface, the first contact surface and the second contact surface being at least partially in contact with each other, and the first contact surface and the second contact surface being substantially annular in shape and extending in the radial direction and in the circumferential direction. It is provided that the first contact surface and/or the second contact surface extend at least partially obliquely relative to the radial direction, an angle being formed between the first contact surface and the second contact surface when viewed in a sectional plane defined by the axial direction and the radial direction.

By configuring the contact surfaces of axially adjacent rotor segments in this way, it is possible to avoid an annular-line-type contact or force-transmission region, which has been described hereinabove as being disadvantageous. Thus, the transmission of axial forces can be better distributed over the entire contact surface, thereby preventing the occurrence of undesired stress peaks.

In the rotor assembly, the first contact surface may be substantially parallel to the radial direction and the second contact surface may be inclined relative to the radial direction. However, the reverse configuration is also possible, in which case the second contact surface may be substantially parallel to the radial direction and the first contact surface may be inclined relative to the radial direction.

In the rotor assembly, the forward rotor segment may be a rotor blade ring and the rear rotor segment may be a seal carrier.

In the rotor assembly, the angle between the first contact surface and the second contact surface may be 0.5° to 3°, in particular 0.8° to 1.2°. The inclination or angle may be selected depending on the remaining geometry of abutting rotor segments or contact surfaces thereof. It is also conceivable that sections having different opening angles may be formed along the radial direction between the two contact surfaces. For example, the opening angle may increase from radially inward to radially outward.

According to another preferred aspect, the forward rotor segment and the rear rotor segment may be clamped together via a single contact surface pair formed by the first annular contact surface and the second annular contact surface. Such a design avoids overdeterminations in the system, such as would occur, for example, in the case of a wedge-shaped joint. Preferably, the first contact surface and the second contact surface may be configured as planar annular surfaces.

According to a further preferred aspect, both the first contact surface and the second contact surface may be inclined relative to the radial direction by no more than 10°, preferably by no more than 5°, particularly preferably by no more than 2°. This prevents the occurrence of excessive radial forces during the clamping of the rotor segments, which could contribute to causing the rotor drum to bend open during operation.

It should generally be noted that the terminology "first rotor segment" and "second rotor segment" is not used to describe the formation of pairs within the rotor assembly. In particular, a second rotor segment may, for example, also function as a first rotor segment if axially adjoined by another (altogether third) rotor segment.

A gas turbine, in particular an aircraft gas turbine, may have at least one rotor assembly as described above. In the gas turbine, the rotor assembly may form part of a low-pressure turbine or a medium-pressure turbine or a high-pressure turbine.

FIG. 1 shows an aircraft gas turbine 10, illustrated, merely by way of example, as a turbofan engine. Gas turbine 10 includes a fan 12 surrounded by a schematically indicated casing 14. Disposed downstream of fan 12 in the axial direction AR of gas turbine 10 is a compressor 16 that is accommodated in a schematically indicated inner casing 18 and may be single-stage or multi-stage. Disposed downstream of compressor 16 is combustor 20. The flow of hot exhaust gas exiting the combustor then flows through the downstream turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a low-pressure compressor 32 so that they are jointly driven or rotated. Disposed downstream of turbine 22 is an exhaust nozzle 33, which is only schematically indicated here.

In the illustrated example of an aircraft gas turbine 10, a turbine center frame 34 is disposed between high-pressure turbine 24 and low-pressure turbine 26 and extends around shafts 28, 30. Hot exhaust gases from high-pressure turbine 24 flow through turbine center frame 34 in its radially outer region 36. The hot exhaust gas then flows into an annular space 38 of low-pressure turbine 26. Compressors 29, 32 and turbines 24, 26 are illustratively represented by rotor blade rings 27. For the sake of clarity, the usually present stator vane rings 31 are shown, by way of example, only for compressor 32.

The following description of an exemplary embodiment of the present disclosure relates in particular to axially adjacent or successive parts of turbine 22.

Figure 2:
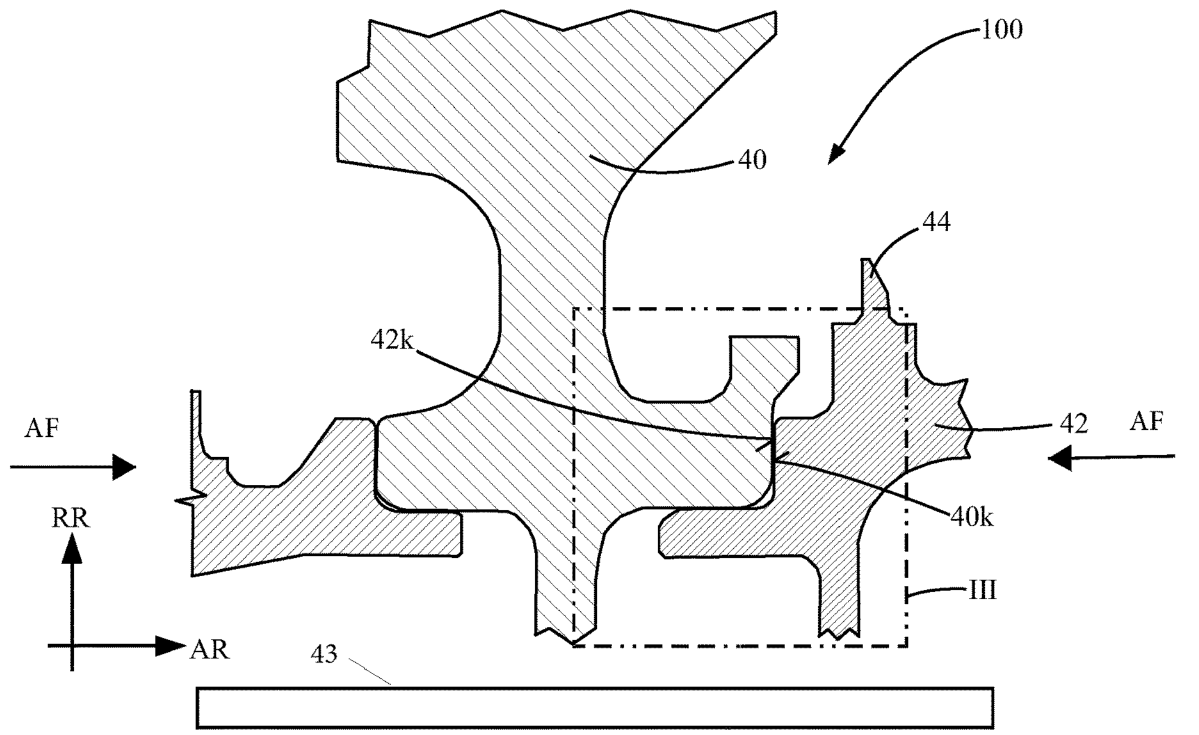
FIG. 2 is a schematic sectional view of a rotor assembly having a plurality of rotor segments.

FIG. 2 shows a forward rotor segment 40 and a rear rotor segment 42 of a rotor assembly 100. Forward rotor segment 40 is, in this example, a rotor blade ring. Rear rotor segment 42 is, in this example, a seal carrier element having a radially outwardly projecting sealing portion 44 of a labyrinth seal. However, first rotor segment 40 and second rotor segment 42 may also be other rotating components of turbine 22 of gas turbine 10.

First rotor segment 40 has a first contact surface 40*k*. In this example, first contact surface 40*k* is an axially rearward surface portion, in particular in the form of an annular surface of forward rotor segment 40. Second rotor segment 42 has a second contact surface 42*k*. In this example, second contact surface 42*k* is an axially forward surface portion, in particular in the form of an annular surface of rear rotor segment 42.

First contact surface 40*k* and second contact surface 42*k* are disposed opposite each other in axial direction AR. Forward rotor segment 40 and rear rotor segment 42 are interconnected or clamped against each other in the axial direction by an axial force (AF) by means of a tie-rod device(tie-rod) 43. As a result, first contact surface 40*k* and second contact surface 42*k* come into contact or are in contact with each other.

Contact surfaces 40*k*, 42*k* transmit or support in particular forces acting in axial direction AR within the group of rotor segments 40, 42.

Figure 3:
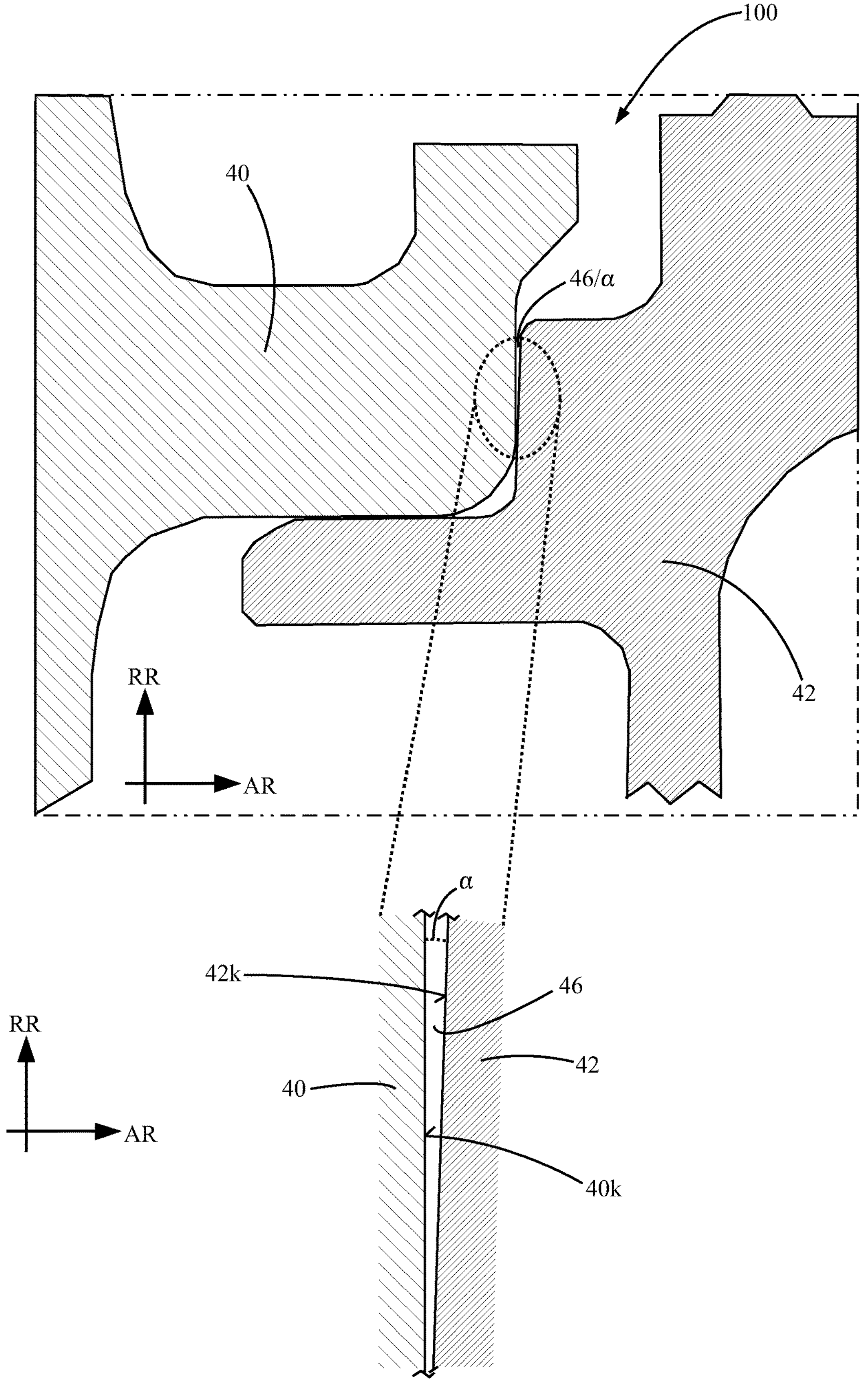
FIG. 3 is an enlarged view of a region indicated by III in FIG. 2.

FIG. 3 shows an enlarged view of the region of the two contact surfaces 40*k*, 42*k* that is encompassed by the dash-dot rectangle III in FIG. 2, as well as a further enlarged view solely of the region of contact surfaces 40*k*, 42*k*.

As can be seen from these enlarged views, an interstitial space 46 is formed at least regionally or in some areas between the two contact surfaces 40*k*, 42*k*. This interstitial space has a small size of only a few millimeters or fractions of millimeters.

In the example shown here, second contact surface 42*k* of rear rotor segment 42 is slightly inclined relative to radial direction RR. Thus, a small or very acute angle α is formed between first contact surface 40*k* and second contact surface 42*k*. The inclination of second contact surface 42*k* is selected such that angle α is about 0.5° to 3°, in particular about 1°.

By arranging the two contact surfaces 40*k*, 42*k* obliquely to each other, axial forces can be better distributed and balanced in this region during operation of the gas turbine. In this way, undesirably high stresses can be avoided as compared to contact surfaces which are oriented parallel to each other. During operation of the gas turbine, interstitial space 46 formed between the two contact surfaces 40*k*, 42*k* is closed due to the thermal and mechanical effects, so that the contact surfaces 40*k*, 42*k* bear against each other during operation. However, this does not result in the formation of an annular-line-shaped force-transmission region where the acting axial forces are so high that fretting or the like can occur. By arranging or configuring contact surface 40*k* or contact surfaces 40*k*, 42*k* obliquely to each other, improved stress distribution is achieved, whereby the material of the two rotor segments 40, 42 is stressed more uniformly.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 aircraft gas turbine
12 fan
14 casing
16 compressor
18 inner casing
20 combustor
22 turbine
24 high-pressure turbine
26 low-pressure turbine
28 hollow shaft
29 high-pressure compressor
30 shaft
31 stator vane ring
32 low-pressure compressor
33 exhaust nozzle
34 turbine center frame
36 radially outer region
38 annular space
40 forward rotor segment
**40*k*** first contact surface
42 rear rotor segment
**42*k*** second contact surface
44 sealing portion
46 interstitial space
100 rotor assembly
$\alpha$ angle

The invention claimed is:

1. A rotor assembly clamped together by an axial clamping force provided by a tie-rod, the rotor assembly being for a gas turbine, the rotor assembly comprising:

a group of rotor segments arranged in succession in an axial direction, the group comprising a first forward rotor segment, a second forward rotor segment, and a rear rotor segment, and the group being clamped together by the axial clamping force; and the first forward rotor segment disposed forwardly in the axial direction having a first contact surface and the rear rotor segment disposed rearwardly in the axial direction having a second contact surface, wherein the first contact surface and the second contact surface are at least partially in contact with each other, wherein the first contact surface and the second contact surface are substantially annular in shape and extend in a radial direction and in a circumferential direction, wherein the first contact surface or the second contact surface extend at least partially obliquely relative to the radial direction, wherein an angle is formed between the first contact surface and the second contact surface when viewed in a sectional plane defined by the axial direction and the radial direction, and wherein the first forward rotor segment and the rear rotor segment are clamped together via a single contact surface pair formed by the first annular contact surface and the second annular contact surface.

2. The rotor assembly as recited in claim 1, wherein the first contact surface is substantially parallel to the radial direction, and in that the second contact surface is inclined relative to the radial direction.

3. The rotor assembly as recited in claim 1, wherein the first forward rotor segment is a rotor blade ring, and the rear rotor segment is a seal carrier.

4. The rotor assembly as recited in claim 1, wherein the angle between the first contact surface and the second contact surface is from 0.5° to 3°.

5. The rotor assembly as recited in claim 1, wherein both the first contact surface and the second contact surface are inclined relative to the radial direction by no more than 10°.

6. The gas turbine comprising the rotor assembly according to claim 1.

7. The gas turbine as recited in claim 6, wherein the rotor assembly forms part of a low-pressure turbine, a medium-pressure turbine, or a high-pressure turbine.

8. The rotor assembly as recited in claim 1, wherein the angle between the first contact surface and the second contact surface is from 0.8° to 1.2°.

9. The rotor assembly as recited in claim 1, wherein both the first contact surface and the second contact surface are inclined relative to the radial direction by no more than 5°.

10. The rotor assembly as recited in claim 1, wherein the second forward rotor segment is disposed forwardly in the axial direction from the first forward rotor segment, wherein the second forward rotor segment has a third contact surface and the first forward rotor segment has a fourth contact surface, wherein the third contact surface and the fourth contact surface are at least partially in contact with each other, wherein the third contact surface and the fourth contact surface are substantially annular in shape and extend in the radial direction and in the circumferential direction, wherein the third contact surface or the fourth contact surface extend at least partially obliquely relative to the radial direction, and wherein an angle is formed between the third contact surface and the fourth contact surface when viewed in the sectional plane defined by the axial direction and the radial direction.

11. The rotor assembly as recited in claim 10, wherein the angle between the third contact surface and the fourth contact surface is from 0.5° to 3°.

* * * * *